United States Patent
Jeong et al.

(10) Patent No.: US 11,014,621 B2
(45) Date of Patent: May 25, 2021

(54) ELECTRONIC DEVICE AND METHOD FOR OPERATING SAME

(71) Applicant: Samsung Electronics Co., Ltd., Gyeonggi-do (KR)

(72) Inventors: Mihyun Jeong, Gyeonggi-do (KR); Minsung Jung, Gyeonggi-do (KR); Kibeom Kim, Gyeonggi-do (KR); Woocheol Jung, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 256 days.

(21) Appl. No.: 16/353,152

(22) Filed: Mar. 14, 2019

(65) Prior Publication Data

US 2019/0283823 A1    Sep. 19, 2019

(30) Foreign Application Priority Data

Mar. 14, 2018    (KR) ........................ 10-2018-0029961

(51) Int. Cl.
| | | |
|---|---|---|
| *B62D 61/00* | (2006.01) | |
| *B62D 11/00* | (2006.01) | |
| *G05D 1/00* | (2006.01) | |
| *G05D 1/02* | (2020.01) | |

(52) U.S. Cl.
CPC ............ *B62D 61/00* (2013.01); *B62D 11/003* (2013.01); *G05D 1/0088* (2013.01); *G05D 1/0212* (2013.01); *G05D 1/0246* (2013.01)

(58) Field of Classification Search
CPC .... B62D 61/00; B62D 11/003; G05D 1/0088; G05D 1/0246; G05D 1/0212; G05D 1/0891
See application file for complete search history.

(56) References Cited

U.S. PATENT DOCUMENTS

2002/0153785 A1 * 10/2002 Fukuyama ............... H02K 7/14
                                                                    310/66
2015/0251318 A1 * 9/2015 Lv ............................ A47L 1/02
                                                                    180/8.1
2017/0203446 A1    7/2017 Dooley et al.

* cited by examiner

*Primary Examiner* — Mary Cheung
(74) *Attorney, Agent, or Firm* — Cha & Reiter, LLC.

(57) ABSTRACT

Certain embodiments disclosed in the present document relate to an electronic device and a method for operating the same. According to an embodiment, it is possible to provide an electronic device including: a ball structure including a housing and a first driving module configured to contact at least a part of an inner surface of the housing and to drive the housing; an outer ring structure rotatably coupled to an outer surface of the ball structure; an inner ring structure arranged inside the housing so as to face the outer ring structure with the housing interposed therebetween; and a second driving module arranged inside the housing so as to drive the inner ring structure.

20 Claims, 12 Drawing Sheets

ELECTRONIC DEVICE AND METHOD FOR OPERATING SAME

CROSS-REFERENCE TO RELATED APPLICATION

This application is based on and claims priority under 35 U.S.C. § 119 of Korean Patent Application No. 10-2018-0029961, filed on Mar. 14, 2018, in the Korean Intellectual Property Office, the disclosure of which is incorporated herein by reference in its entirety.

BACKGROUND

1. Field

Certain embodiments disclosed in the present document generally relate to an electronic device and a method for operating the same.

2. Description of the Related Art

Various kinds of electronic devices (for example, robots or other artificial intelligence devices such as smart speakers) perform operations by accepting voice commands. For example, a robot may be placed in a smart home environment and a family member of the smart home may operate the robot by issuing voice commands.

Such electronic devices include, for example, a fixed home robot that is placed on a table or attached to a wall, a mobile home robot having wheels coupled to the body portion thereof such that it can move inside the house, etc.

SUMMARY

The above-referenced mobile home robot may have to operate in a relatively narrow space (e.g. a narrow hallway of the home) and thus is required to able to freely change directions so that it can efficiently move in narrow spaces. Most conventional mobile home robots include a function portion (for example, an imaging portion including a camera) and a driving portion.

According to certain embodiments disclosed in the present document, it is possible to provide a mobile electronic device and a method for operating the same, wherein, in addition to efficient movement, the mobile electronic device also has an improved aesthetic appearance and may implement dynamic/emotionally appealing/original movements.

According to certain embodiments disclosed in the present document, it is possible to provide an electronic device and a method for operating the same, wherein the mobile electronic device can be driven according to an input from an external electronic device or autonomously.

In certain embodiments disclosed in the present document, it is possible to provide an electronic device and a method for operating the same, wherein magnetic levitation technology is applied thereto such that the mobile electronic device can perform stable and rapid operations.

According to certain embodiments disclosed in the present document, it is possible to provide an electronic device including: a ball structure including a housing and a first driving module configured to contact at least a part of an inner surface of the housing and to drive the housing; an outer ring structure rotatably coupled to an outer surface of the ball structure; an inner ring structure arranged inside the housing so as to face the outer ring structure with the housing interposed therebetween; and a second driving module arranged inside the housing so as to drive the inner ring structure.

According to certain embodiments disclosed in the present document, it is possible to provide an electronic device including: a ball structure; an outer ring structure coupled to surround the ball structure and configured to rotate while being spaced apart from an outer surface of the ball structure; and an inner ring structure arranged inside the housing so as to face the outer ring structure with the housing interposed therebetween, wherein the ball structure is configured to be able to roll toward a first direction and yaw with reference to an axis perpendicular to the first direction, and the outer ring structure is configured to tilt with respect to the first direction and rotate in a circumferential direction.

According to certain embodiments disclosed in the present document, it is possible to provide a method for operating an electronic device including a ball structure, an outer ring structure rotatably coupled to an outer surface of the ball structure, an inner ring structure arranged inside the ball structure so as to face the outer ring structure, at least one camera module configured to acquire an image of an external object, at least one sensor module disposed on the outer ring structure, and a processor, the method including: receiving input information by the electronic device; determining a distance between the electronic device and the external object by using the image obtained by the camera module and/or information obtained by the sensor module; analyzing an optimal path of movement of the electronic device; controlling the ball structure such that the electronic device faces a first direction corresponding to the path of movement; and controlling the outer ring structure to face a second direction.

According to certain embodiments disclosed in the present document, it is possible to provide an electronic device having a simple and aesthetic appearance. Because the electronic device has artificial intelligence and may participate in a conversation with the user, the electronic device according to the disclosure of the present document may configured to provide an emotionally appealing stimulus.

According to certain embodiments disclosed in the present document, two movable elements (for example, a ball structure and an outer ring structure) can move independently, such that efficient/intelligent/emotionally appealing/dynamic/original movements can be implemented.

According to certain embodiments disclosed in the present document, a magnetic levitation scheme is used such that rapid operations of the electronic device can be performed, and the electronic device can rapidly recover from an abnormal operating condition.

According to certain embodiments disclosed in the present document, a structure is provided to prevent the outer ring structure from moving away from the surface of the housing such that the electronic device can rapidly recover from an abnormal operating condition.

Additional aspects will be set forth in part in the description which follows and, in part, will be apparent from the description, or may be learned by practice of the presented embodiments.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
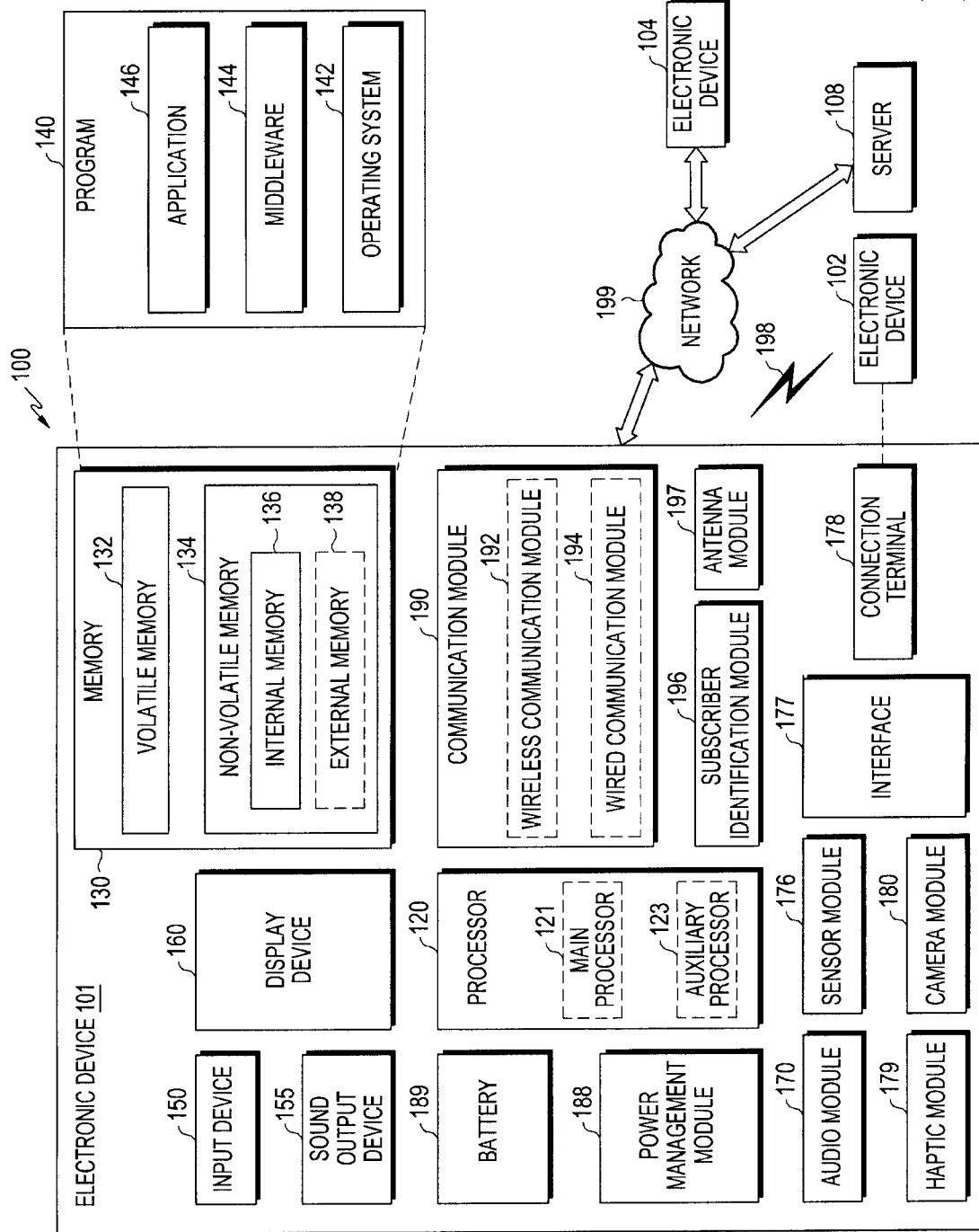
FIG. 1 is a block diagram of an electronic device inside a network environment according to certain embodiments.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2A:
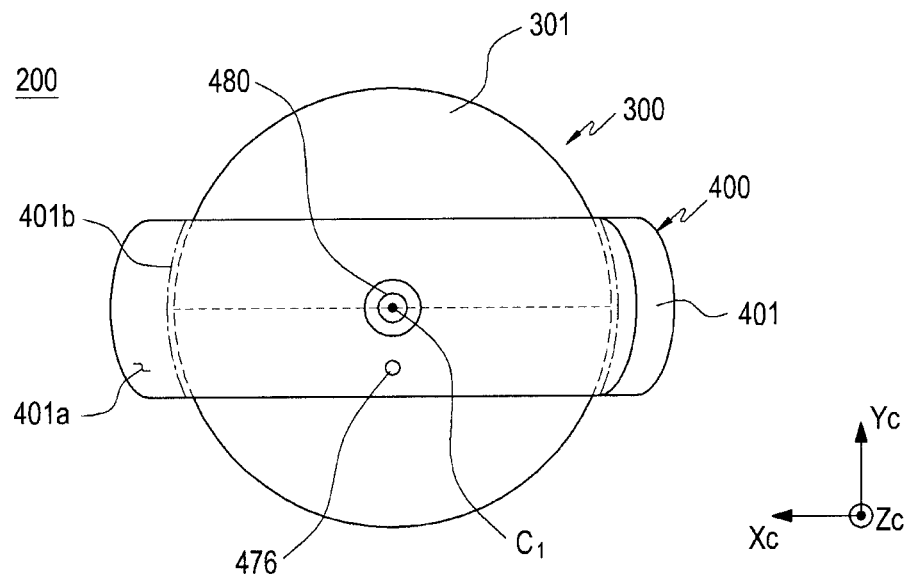
FIG. 2A is a front view illustrating the exterior of an electronic device according to an embodiment of the present disclosure.
Figure 2B:
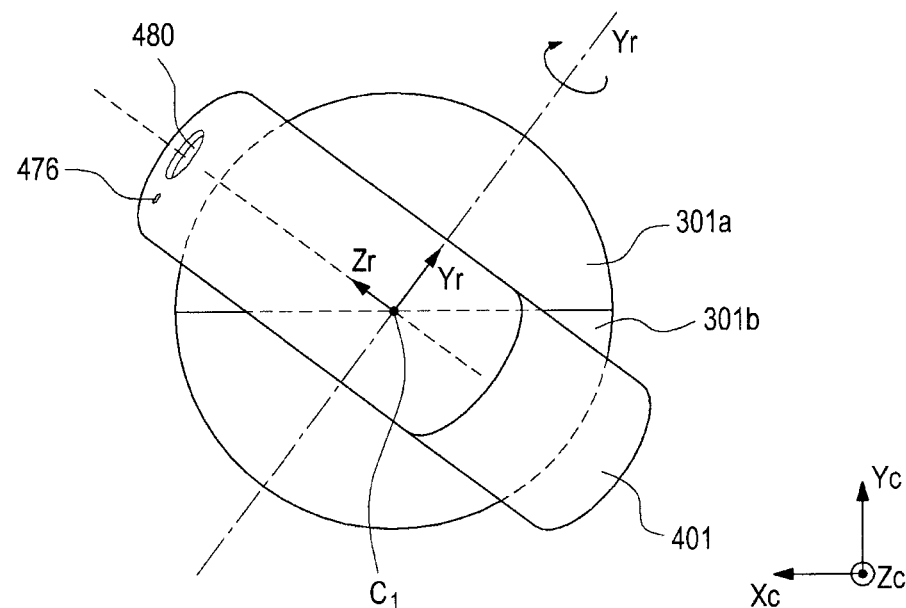
FIG. 2B is a side view illustrating the exterior of the electronic device during operation according to an embodiment of the present disclosure.
Figure 2C:
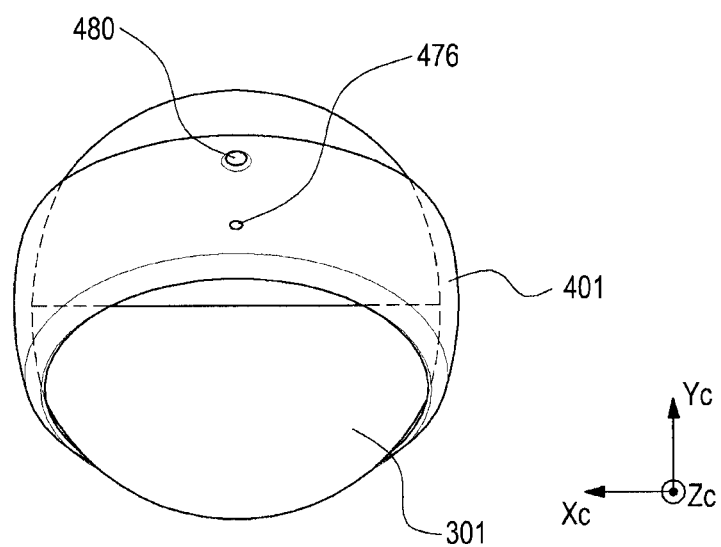
FIG. 2C is a perspective view illustrating the exterior of the electronic device during operation according to an embodiment of the present disclosure.

FIG. 2A is a front view illustrating the exterior of an electronic device 200 (for example, the electronic device 101 of FIG. 1) according to an embodiment disclosed in the present document. FIG. 2B is a side view illustrating the exterior of the electronic device 200 during operation (for example, the electronic device 101 of FIG. 1). FIG. 2C is a perspective view illustrating the exterior of the electronic device 200 (for example, the electronic device 101 of FIG. 1) during operation.

Referring to FIG. 2A, the electronic device 200 (for example, the electronic device 101 of FIG. 1) may include a ball structure 300 and an outer ring structure 400. According to an embodiment, the ball structure 300 may be in contact with a supporting surface such as a floor of the home, and may be a part that substantially constitutes the body of the electronic device 200. According to an embodiment, the ball structure 300 may be a movable element that moves the electronic device 200 in any direction while being placed on the floor.

According to an embodiment, the surface of the ball structure 300 may be a sphere. The description that the surface of the ball structure 300 is a sphere may mean that the surface has an "entirely or partially" or "approximately or completely" sphere-type surface.

According to an embodiment, the outer ring structure 400 is configured to be separate from the ball structure 300, and may move independently of the ball structure 300. Movements of the outer ring 400 may be implemented through an interaction with the ball structure 300 while being separated from the ball structure 300.

According to an embodiment, the outer ring structure 400 may be configured to remain separated from the surface of the housing 301 of the ball structure 300 using principles of magnetic levitation.

According to an embodiment, the ball structure 300 and the outer ring structure 400 may include magnet units, respectively, and respective magnet units may be positioned to face each other. Accordingly, the outer ring structure 400 of the electronic device 200 (for example, the electronic device 101) may be spaced apart from the ball structure 300 by a predetermined distance such that the outer ring structure 400 is substantially levitated.

According to an embodiment, the outer ring structure 400 may be a ring-shaped member having a predetermined thickness. The inner diameter of the outer ring structure 400 may be larger than the outer diameter of the ball structure 300 such that the outer ring structure 400 surrounds the ball structure 300.

According to an embodiment, the outer ring structure 400 and the sphere-type ball structure 300 may form concentric circles when viewed from the top and thus have the same center $c1$. As shown in FIG. 2A, when viewed from the front, the outer ring structure 400 may be arranged at the central portion of the ball structure 300.

Referring to the direction components illustrated in FIG. 2A to FIG. 2C, according to an embodiment disclosed in the present document, direction components $Xc$, $Yc$, and $Zc$ may be coordinate axes corresponding to the center $c1$ illustrated in FIG. 2A and FIG. 2B. In this case, the direction component $Xc$ may be perpendicular to $Yc$, $Yc$ may be perpendicular to $Zc$, and $Xc$ and $Zc$ may also be perpendicular to each other.

According to an embodiment, the ball structure 300 may roll in a first direction while being placed on the floor, and may yaw with reference to a rotating axis perpendicular to the first direction. According to an embodiment, assuming that a virtual plane defined by the direction components $Xc$ and $Zc$ is the floor on which the electronic device 200 moves, the ball structure 300 may roll in the first direction (for example, the direction parallel with the $Xc$ direction) of the virtual plane defined by the direction components $Xc$ and $Zc$, and the ball structure 300 may change directions by rotating with respect to an axis parallel to the direction component $Yc$.

According to an embodiment, the ball structure 300 and the outer ring structure 400 are coupled to each other and move together such that, when the ball structure 300 moves, the outer ring structure 400 can also move. The outer ring structure 400 can move independently of the ball structure 300, and the inclination by which the outer ring structure 400 is oriented may tilt (or pitch) with respect to the ball structure 300. Further, the outer ring structure 400 may rotate in its circumferential direction. According to an embodiment, prior to any movement of the ball structure 300, the outer ring structure 400 may be initially horizontal with the floor. When the ball structure 300 is moving on the other hand, the outer ring structure 400 may slope around the center $c1$ such that, for example, a camera module 480 provided on the outer ring structure 400 faces in the upward direction, as shown in FIG. 2B. In addition, the outer ring structure 400 may rotate while or without being interlocked with the yawing operation of the ball structure 300. According to an embodiment, the outer ring structure 400 may rotate with reference to the same axis as the axis (for example, $Yc$) around which the ball structure 300 rotates or a different axis, for example axis ($Yr$).

According to an embodiment, when the ball structure 300 is moving in a direction parallel with the direction component $Xc$ axis, the outer ring structure 400 may move while remaining parallel with a virtual plane defined by the direction components $Xc$ and $Zc$. As another example, while the ball structure 300 moves, the outer ring structure 400 may move while remaining inclined instead of being parallel with the virtual plane defined by the direction components Xc and Zc. As still another example, the inclination of the outer ring structure 400 may vary while the ball structure 300 moves.

Figure 3:
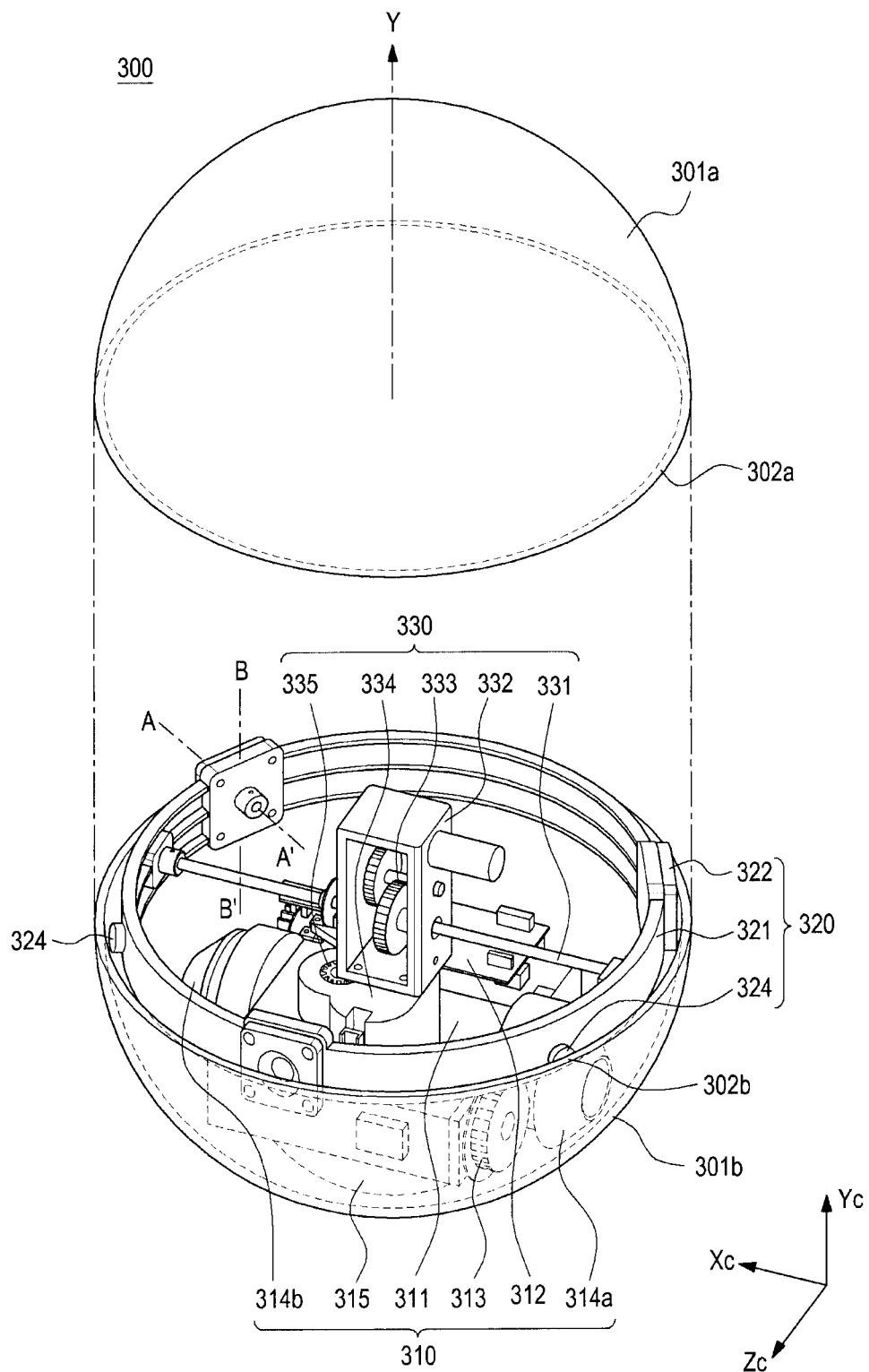
FIG. 3 is a perspective view of a ball structure according to an embodiment of the present disclosure.

FIG. 3 is a perspective view of a ball structure 300 (for example, the ball structure 300 of FIG. 2A) according to an embodiment of the present disclosure.

Referring to FIG. 3, the ball structure 300 according to an embodiment may include a housing 301 (for example, the housing 301 of FIG. 2A) and a first driving module 310 included inside the housing 301.

According to an embodiment, the housing 301 may include an upper housing 301a and a lower housing 301b. According to an embodiment, the upper housing 301a and the lower housing 301b may be hemispheres coupled to each other so as to form a sphere-shaped housing 301 as a whole. According to an embodiment, the fastening surface 302a of the upper housing 301a and the fastening surface 302b of the lower housing 301b may have various fastening structures. For example, screw coupling may be adopted, or separate fastening members may be employed. The upper housing 301a and the lower housing 301b may be firmly fastened to each other such that the housings are not separated when the ball structure 300 travels on uneven surfaces or traverses stairs.

According to an embodiment, the housing 301 may have a space formed therein such that various constituent elements of the electronic device (for example, the electronic device 101) are mounted therein. Compared with the space, the thickness of the housing 301 may be relatively thin, and the housing 301 may be made of a material for preventing scratching, hollowing, or fracturing.

According to an embodiment, the housing 301 may be made of various materials such as polyethylene, polyethylene terephthalate, polycarbonate, glass, acrylic resin, and/or synthetic resin. According to an embodiment, the housing 301 may be made of a non-transparent material. According to another embodiment, the housing 301 may be made of a transparent material such that the interior is visible from the outside.

According to an embodiment, various constituent elements of the electronic device (for example, the electronic device 101) arranged inside the ball structure 300 may be primarily housed by the lower housing 301b. Such arrangement of various heavy constituent elements in the lower housing 301b may lower the center of gravity of the electronic device, thereby enabling stable operation of the electronic device. Various constituent elements of the electronic device (for example, the electronic device 101) arranged inside the ball structure 300 may include a power management module (for example, the power management module 188 of FIG. 1) for providing the first driving module 310 or the second driving module 330 with driving power, a battery (for example, the battery 189 of FIG. 1), a board 312, and power transfer members (for example, gears) 313 and 335.

According to an embodiment, a first driving module 310 may be provided to enable travel for the ball structure 300. According to an embodiment, the first driving module 310 may include a first motor part 311 and a plurality of inclined wheels 314b and 314b. The plurality of inclined wheels may be divided into two inclined wheels, that is, a first inclined wheel 314a and a second inclined wheel 314b. The first inclined wheel 314a and the second inclined wheel 314b may face in opposite directions and may contact at least a part of the inner curved surface of the housing 301.

According to an embodiment, the first motor part 311 may be connected to a processor (for example, the processor 120) so as to receive a control input regarding the first driving module 310 and to drive the same. The first motor unit 311 may provide driving power that moves the first inclined wheel 314a or the first inclined wheel 314a and the second inclined wheel 314b. In connection with the plurality of inclined wheels 314a and 314b, the first inclined wheel 314a and the second inclined wheel 314b may both contact at least a part of the inner curved surface of the housing and may move simultaneously. To this end, the first inclined wheel 314a and the second inclined wheel 314b may have tapered shapes when viewed in the lateral direction.

According to an embodiment, the driving of the second inclined wheel 314b may be dependent on the driving of the first inclined wheel 314a. Alternatively, the second inclined wheel 314b may be driven independently of the first inclined wheel 314a. For example, when the first inclined wheel 314a is driven by the first motor part 311 (e.g. when the first inclined wheel 314a rotates due to it sharing a rotating axis with the first motor part 311), the second inclined wheel 314b may rotate together.

According to another embodiment, each of the first inclined wheel 314a and the second inclined wheel 314b may be connected to the first motor part 311. In this case, two objects may provide the first motor part 311 with driving power. For example, the first motor part 311 may include a plurality of motors (for example, a $(1\text{-}1)^{th}$ motor and a $(1\text{-}2)^{th}$ motor), the first inclined wheel 314a may be connected to the $(1\text{-}1)^{th}$ motor, and the second inclined wheel 314b may be connected to the $(1\text{-}2)^{th}$ motor. In this case, the first inclined wheel 314a may be synchronized with rotation of the $(1\text{-}1)^{th}$ motor and be moved accordingly, and the second inclined wheel 314b may be synchronized with rotation of the $(1\text{-}2)^{th}$ motor and be moved accordingly.

According to an embodiment, the inner curved surface of the housing 301 may be moved by the first inclined wheel 314a and the second inclined wheel 314b due to friction, and the housing 301 may accordingly roll in a first direction (for example, direction parallel with Xc direction) or yaw around an axis defined by a direction (for example, direction parallel with Yc direction) perpendicular to the first direction.

According to an embodiment, when the electronic device (for example, the electronic device 200) travels forward or backward, the first inclined wheel 314a and the second inclined wheel 314b may rotate in the same direction. According to another embodiment, when the electronic device (for example, the electronic device 200) yaws, the first inclined wheel 314a and the second inclined wheel 314b may rotate in different directions.

According to an embodiment, the first driving module 310 may have a weight member 315 arranged thereon. The weight member 315 is configured to be positioned on the lower part of the first driving module 310 and, according to an embodiment, may be positioned on the lower surface of the first motor part 311. So that the first driving module 310 is compactly provided inside the lower housing 301b, the weight member 315 may have a shape corresponding to shape of the inner curved surface of the lower housing 301b for the purpose of compact configuration.

According to an embodiment, in order to facilitate rolling and yawing of the ball structure 300, slipping between the first inclined wheel 314a, the second inclined wheel 314b, and the lower housing 301b, should be minimized. For example, parts of the first inclined wheel 314a, the second inclined wheel 314b, and the lower housing 301b that contact each other may be at least partially made of a material that can increase frictional force.

According to an embodiment, the electronic device (for example, the electronic device 200 of FIG. 2a) includes an inner ring structure 320, which may be arranged inside the housing 301.

According to an embodiment, the inner ring structure 320 may be configured to have a diameter smaller than that of the outer ring structure 400 and may be configured to have a diameter smaller than that of the housing 301 since the same is arranged inside the housing 301. According to an embodiment, the inner ring structure 320 may be configured such that it is arranged to face the outer ring structure 400 with the housing 301 interposed therebetween.

According to an embodiment, the inner ring structure 320 may include a body portion 321 and a first magnet containing portion 322 in which a first magnet unit is mounted. The body portion 321 may be a constituent element that determines the overall ring shape of the inner ring structure 320, and the first magnet containing portion 322 have at least one magnet provided therein so as to provide magnetic interactions with the outer ring structure 400.

According to an embodiment, a plurality of first magnet containing portions 322 may be arranged along the circumferential direction of the body portion 321. For example, three first magnet containing portions 322 may be arranged to be spaced apart at regular intervals on the inner ring structure 320 as illustrated in FIG. 3.

According to an embodiment, one end of a horizontal shaft member 331 may be coupled to at least a part of the body portion 321 or the first magnet containing portion 322, and the other end of the horizontal shaft member 331 may be coupled to another part of the body portion 321 or the first magnet containing portion 322 such that, when the horizontal shaft member 321 moves, the inner ring structure 320 is correspondingly rotated.

According to an embodiment, a plurality of bearing members 324 may be arranged on the outer surface of the body portion 321 such that the body portion 321 may slide smoothly with respect to the housing 301. Further a plurality of ribs extending along the circumferential direction may be formed on the inner surface of the body portion 321 to provide rigidity.

According to an embodiment, the electronic device (for example, the electronic device 200 of FIG. 2A) may include a second driving module 330 arranged inside the housing 301 such that the inner ring structure 320 can be driven by the second driving module 330.

According to an embodiment, the second driving module 330 may include a second motor member (not illustrated), a horizontal shaft member 331, a tilting member 332, and/or a rotating member 334. One end of the horizontal shaft member 331 may be coupled to a part of the inner surface of the inner ring structure 320, and the other end thereof may be coupled to another part of the inner surface of the inner ring structure 320. The horizontal shaft member 331 may transfer driving power from the second driving module 330 to the inner ring structure 320, thereby driving the outer ring structure 400. Therefore, the horizontal shaft member 331 may have a high level of strength and may be firmly fastened to the inner ring structure 320.

The tilting member 332 may be coupled to at least a part of the horizontal shaft member 331 so as to rotate the horizontal shaft member 331 such that the inclination of the inner ring structure 320 can be adjusted. A plurality of gear trains 333 may be arranged inside the tilting member 332 such that the horizontal shaft member 331 can be tilted with reference to a horizontal axis (for example, an axis parallel with direction component Xc), and the inner ring structure 320 can also be tilted accordingly. For example, when the horizontal shaft member 331 is tilted with reference to an axis parallel with the direction component Xc, the inner ring structure 320 may slope at various angles with respect to the plane defined by the direction components Yc and Zc, along the inner surface of the housing 301.

According to an embodiment, at least a part of the horizontal shaft member 331 may penetrate the tilting member 332 as illustrated in FIG. 3, and may share an axis with at least some of the gear trains 333 inside the tilting member 332.

The rotating member 334 may be coupled to at least a part of the tilting member 332 so as to rotate at least a part of the tilting member 332 such that the inner ring structure 320 is rotated in the circumferential direction. According to an embodiment, the rotating member 334 may be arranged on the lower portion of the tilting member 332. The rotating member 334 may be configured to be coupled to the lower portion of the housing of the tilting member 332 or to a gear train (not illustrated) extending to the lower portion of the housing of the tilting member 332 such that, when the rotating member 334 rotates, at least a part of the tilting member 332 can rotate.

According to an embodiment, a second motor member (not illustrated) may be coupled to each of the tilting member 332 and the rotating member 334 in order to independently control driving of the tilting member 332 and the rotating member 334. For example, the second motor member may include a plurality of motors (for example, a $(2\text{-}1)^{th}$ motor (not illustrated) and a $(2\text{-}2)^{th}$ motor (not illustrated)). For example, the $(2\text{-}1)^{th}$ motor may be coupled to the tilting member 332, and the $(2\text{-}2)^{th}$ motor may be coupled to the rotating member 334 such that the tilting member 332 and the rotating member 334 can be driven independently.

According to an embodiment, the second driving module 330 may be arranged on the upper portion of the first driving module 310. Since the first driving module 310 is configured to control the overall movement of the electronic device (for example, the electronic device 200 of FIG. 2A) and may constitute the largest portion of the electronic device by weight, it may be arranged near the lower side of the lower housing 301b so the electronic device is provided with a lower center of gravity. After the first driving module 310 is arranged, the second driving module 330 may be mounted on the upper portion of the first driving module 310. This arrangement may create a more stable device. According to an embodiment, when the second driving module 330 is provided on the upper portion of the first driving module 310, at least some of the elements that couple the tilting member 332 and the horizontal shaft member 331 may be arranged to be positioned near or at the overall center c1 of the ball structure 300.

Figure 4:
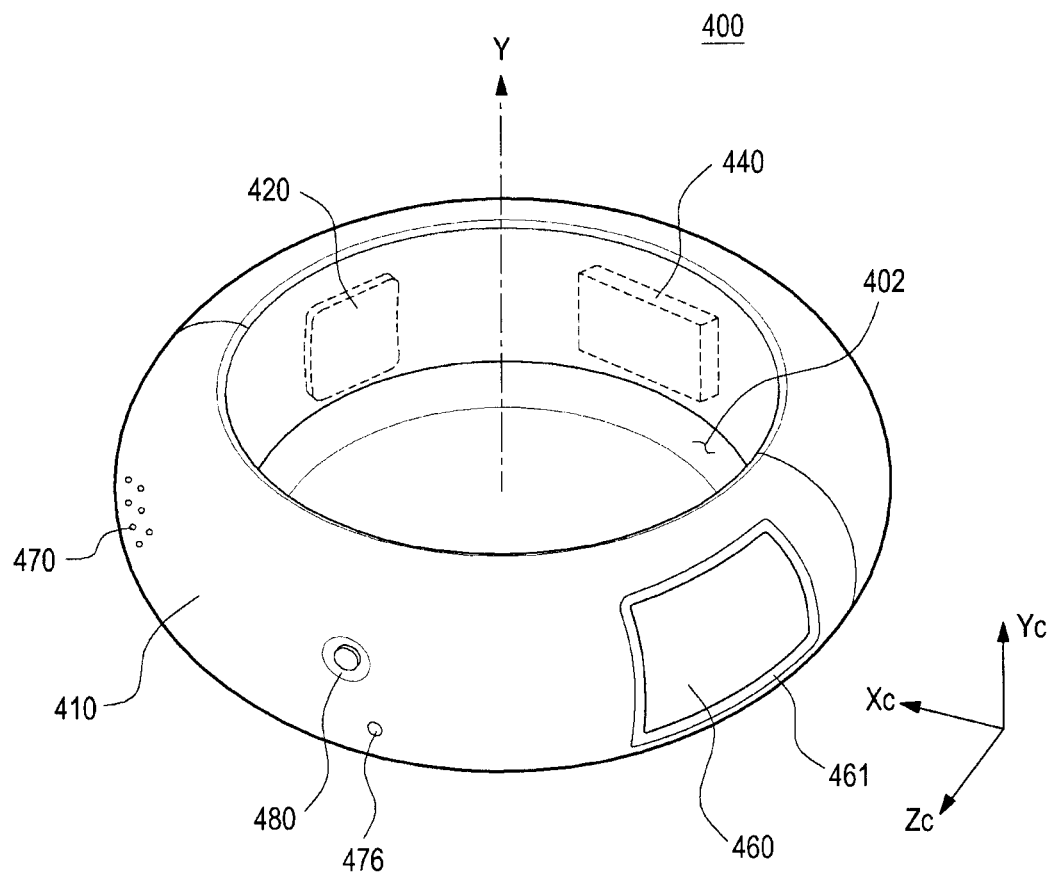
FIG. 4 is a perspective view of an outer ring structure according to an embodiment of the present disclosure.

FIG. 4 is a perspective view of an outer ring structure 400 (for example, the outer ring structure 400 of FIG. 2A) according to an embodiment of the present disclosure.

Referring to FIG. 4, the outer ring structure 400 (for example, the outer ring structure 400 of FIG. 2A) may be coupled to the ball structure 300 illustrated in FIG. 3 along the Y-axis direction illustrated in the drawing. As mentioned above, the outer ring structure 400 according to an embodiment may be coupled to be able to rotate on the surface of the ball structure 300, and at least a part of the outer ring structure 400 according to an embodiment may be spaced apart from the surface of the ball structure 300.

The inner diameter of the outer ring structure 400 may be set to be larger than the outer diameters of the inner ring structure 320 and the housing 301. When the outer ring structure 400 is assembled with the ball structure 300, a predetermined space may be formed between the outer ring structure 400 and the ball structure 300 such that the outer ring structure 400 can freely rotate about the surface of the ball structure 300.

According to an embodiment, the movement of the outer ring structure 400 may be synchronized with the movement of the inner ring structure 320. As used herein, synchronized movement may mean that the outer ring structure 400 moves in the same direction as the direction of movement of the inner ring structure 320.

According to an embodiment, the outer ring structure 400 may be levitated from the surface of the housing 301 by the magnetic force between it and the inner ring structure 320. That is, principles of magnetic levitation may be adopted for the electronic device (for example, the electronic device 200) such that the outer ring structure 400 is spaced apart from the housing 301.

According to an embodiment, the outer ring structure 400 may include a second magnet unit on at least a part (for example, second magnet containing portion 420) of the body portion 410, and the second magnet containing portion 420 may be configured to face at least a part (for example, first magnet containing portion 322) of the inner ring structure 320. The outer ring structure 400 may be levitated from the surface of the housing 301 due to the magnetic force between the second magnet unit arranged inside the second magnet containing portion 420 and the first magnet unit arranged inside the first magnet containing portion 322.

According to an embodiment, a plurality of second magnet containing portions 420 may be arranged along the circumferential direction of the outer ring structure 400 as in the case of the plurality of first magnet containing portions 322. As could be inferred from FIGS. 3 and 4, three second magnet containing portions 420 may be arranged to be spaced apart at regular intervals.

According to an embodiment, at least three first magnet containing portions (for example, first magnet containing portions 322) and at least three second magnet containing portions 420 may be provided such that the outer ring structure 400 can stably move on the surface of the ball structure 300 with minimized vibration.

According to an embodiment, the outer ring structure 400 may include at least one camera module 480 (for example, camera module 180) or sensor module 476 (for example, sensor module 176). The at least one camera module 480 or sensor module 476 may be embedded in the surface of the outer ring structure 400 and installed such that at least a part thereof is exposed to the exterior of the electronic device.

Use of the at least one camera module 480 and sensor module 476 makes it possible to acquire data necessary to identify the position of an external object and to recognize the distance to the external object. The sensor module 476 is illustrated in the drawing may be an infrared sensor configured to recognize the distance to the external object, but is not necessarily limited thereto.

The camera module 480 may images obtained by photographing the external environment of the electronic device (for example, the electronic device 200). The sensor module 476, which may be an infrared sensor configured to recognize the distance to an external object in the external environment, may acquire a three-dimensional feature point coordinate in the images. The feature point coordinate may be analyzed by using a processor (for example, main processor 121 or auxiliary processor 123) such that the position of the electronic device and the position of the external object can be identified, and the electronic device can be controlled to move with respect to the external object, for example, to avoid the external object.

According to an embodiment, at least one audio module 470 (for example, audio module 170) may be provided as illustrated in FIG. 4. Use of the same enables communication between the electronic device (for example, the electronic device 200 of FIG. 2A) and the user, and the user's command can also be received.

According to an embodiment, the outer ring structure 400 may have at least one display portion 460. The display portion 460 may be provided on the surface of the outer ring structure 400 such that information regarding the electronic device (for example, the electronic device 200 of FIG. 2A) can be displayed.

According to an embodiment, when the processor (for example, the processor 120 of FIG. 1) receives input information, the display portion 460 may provide a screen display corresponding to the received input information. For example, the display portion 460 may display the operating condition of the electronic device (for example, displaying whether or not the device is driven in a designated mode), the power condition (for example, on/off), and whether or not the battery needs to be charged.

According to an embodiment, at least a part of the display portion 460 may be bent and seated on a window assembly 461. The window assembly 461 may have at least one physical structure for seating formed thereon such that the display portion 460 can remain in a constantly bent condition.

According to an embodiment, at least one camera module 480 or at least one sensor module 476 may be combined with the display portion 460 such that a single constituent element can perform a plurality of functions.

According to an embodiment, the outer ring structure 400 may have an additional component 440. For example, the component 440 may be a battery module or a wireless battery charging module. For example, when the component 440 is a battery module, it can be used to supply power necessary to drive at least one of the above-mentioned display portion 460, the audio module 470, the sensor module 476, and the camera module 480.

Figure 5:
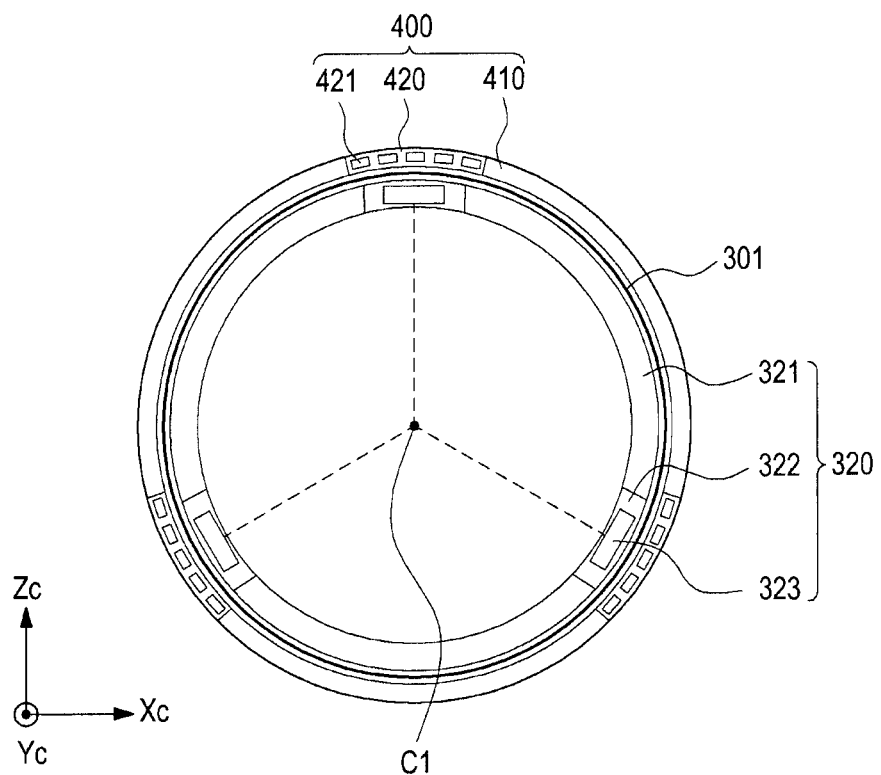
FIG. 5 is a conceptual diagram illustrating a positional relationship between the outer ring structure, the housing of the ball structure, and an inner ring structure according to an embodiment of the present disclosure.

FIG. 5 is a conceptual diagram illustrating the positional relationship between the outer ring structure 400 (for example, the outer ring structure 400 of FIG. 4), the housing 301 (for example, the housing 301 of FIG. 3) of the ball structure, and the inner ring structure 320 (for example, the inner ring structure 320 of FIG. 3) according to an embodiment of the present disclosure. According to an embodiment, FIG. 5 may illustrate a section of the configuration of FIG. 2A taken at the center c1 in a direction parallel with the virtual plane defined by direction components Xc and Zc.

Referring to FIG. 5, the outer ring structure 400 (for example, the outer ring structure 400 of FIG. 4), the housing 301 (for example, the housing 301 of FIG. 3), and the inner ring structure 320 (for example, the inner ring structure 320 of FIG. 3) are illustrated to be spaced apart from one another by the same interval, but are not necessarily limited thereto. According to an embodiment, the outer ring structure 400 may be spaced apart from the surface of the housing 301. According to another embodiment, the inner ring structure 320 may be spaced apart from the surface of the housing 301 or may be driven while making contact therewith using a bearing member (for example, bearing member 324).

According to an embodiment, the inner ring structure 320 may include a body portion 321 and a first magnet containing portion 322, and may have a first magnet unit 323 provided in the first magnet containing portion 322. According to an embodiment, the outer ring structure 400 may include a body portion 410 and a second magnet containing portion 420 arranged to face the first magnet containing portion 322, and may have a second magnet unit 421 provided in the second magnet containing portion 420.

According to an embodiment, the first magnet unit 323 and/or the second magnet unit 421 may be a permanent magnet. According to another embodiment, the first magnet unit 323 and/or the second magnet unit 421 may be an electromagnet. For example, when the first magnet unit 323 is an electromagnet, it may be supplied with a current from the power management module (for example, the power management module 188 of FIG. 1) included in the ball structure 300 and be magnetized.

According to an embodiment, the second magnet unit 421 included in the outer ring structure 400 may be provided as a plurality of second magnet units 421, which may be aligned radially along the circumferential direction of the outer ring structure 400. According to an embodiment, as illustrated in FIG. 5, the second magnet units 421 may be arranged outside the first magnet units 323 so as to face approximately the center c1 of the housing 301.

Figure 6A:
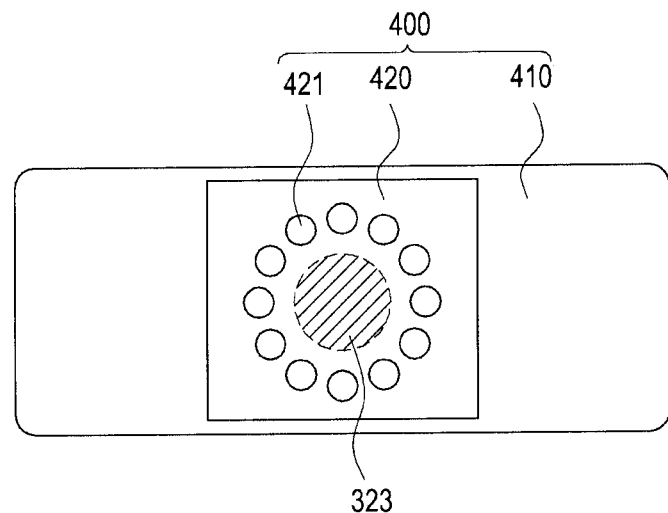
FIG. 6A is a conceptual diagram illustrating an arrangement structure of a first magnet unit and a second magnet unit when the outer ring structure is coupled to the ball structure according to an embodiment of the present disclosure.
Figure 6B:
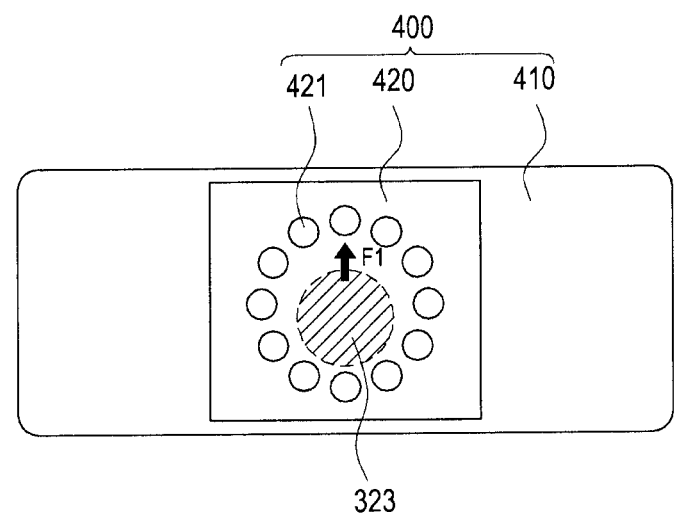
FIG. 6B is a conceptual diagram illustrating a process in which the first magnet unit and the second magnet unit illustrated in FIG. 6A, when in mismatching positions, return to the matching positions according to an embodiment of the present disclosure.
Figure 6C:
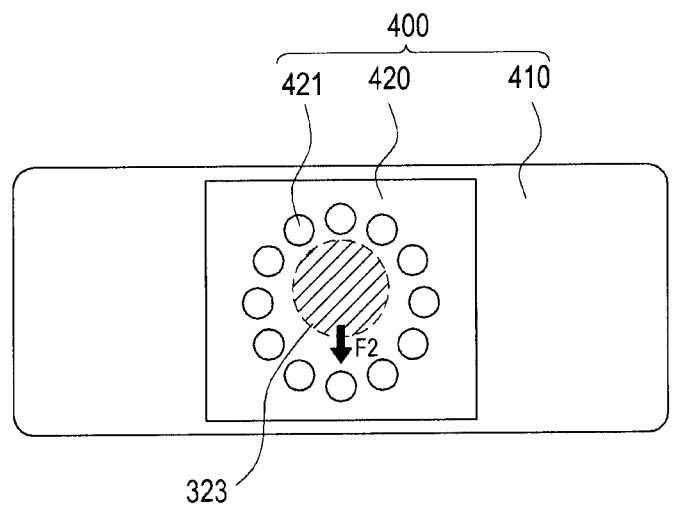
FIG. 6C is a conceptual diagram illustrating another process in which the first magnet unit and the second magnet unit illustrated in FIG. 6A, when in mismatching positions, return to the matching positions according to an embodiment of the present disclosure.
Figure 6D:
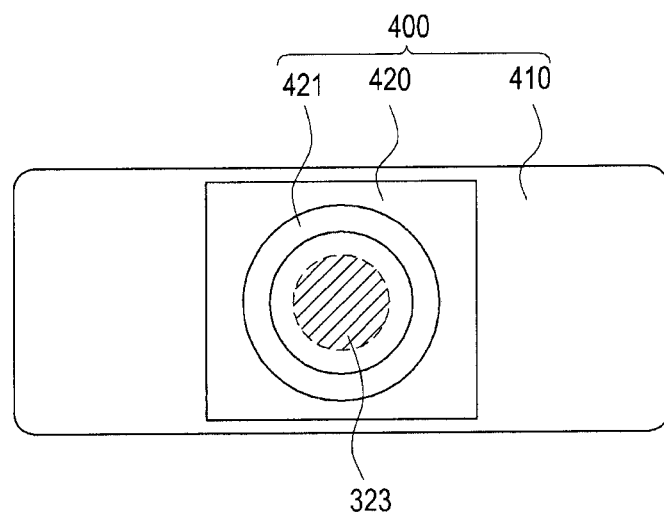
FIG. 6D is a conceptual diagram illustrating the second magnet unit formed in a ring structure according to another embodiment of the present disclosure.

FIG. 6A is a conceptual diagram illustrating the arrangement structure of the first magnet unit 323 and the second magnet unit 421 when the outer ring structure (for example, the outer ring structure 400 of FIG. 4) is coupled to the ball structure (for example, the ball structure 300 of FIG. 3) according to an embodiment of the present disclosure. FIG. 6B is a conceptual diagram illustrating a process in which the first magnet unit 323 and the second magnet unit 421 illustrated in FIG. 6A, when in mismatching positions, return to matching positions according to an embodiment. FIG. 6C is a conceptual diagram illustrating another process in which the first magnet unit 323 and the second magnet unit 421 illustrated in FIG. 6A, when in mismatching positions, return to matching positions. FIG. 6D is a conceptual diagram illustrating the second magnet unit 421 formed in a ring structure according to another embodiment of the present disclosure.

FIG. 6A illustrates an arrangement structure, seen from the front, of the first magnet unit 323 and the second magnet unit 421. According to an embodiment, FIG. 6A may illustrate the first magnet unit 323 and the second magnet unit 421 overlapping each other when seen along A-A' of FIG. 3.

As illustrated in FIG. 6A, according to an embodiment, the first magnet unit 323 and the second magnet unit 421 may be arranged such that, when seen from the front of the electronic device (for example, the electronic device 200 of FIG. 2A), a plurality of second magnet units 421 surround the first magnet unit 323.

For example, when a plurality of second magnet units 421 are provided, the second magnet units 421 may be arranged radially so as to constitute a ring structure in the second magnet containing portion 420. According to an embodiment, the first magnet units 323 and the second magnet unit 421 may be arranged such that, when seen from the front, the center of the arrangement structure of the plurality of second magnet units 421 is identical to the center of the first magnet unit 323. Such a configuration can prevent the first magnet units 323 illustrated in FIG. 6A from moving away from the center of arrangement structure of the second magnet units 421 when the outer ring structure 400 moves on the surface of the ball structure 300 or is disturbed by an outside force.

Referring to FIG. 6B and FIG. 6C together, even if the first magnet unit 323 in FIG. 6A moves away from the center of arrangement structure of the second magnet units 421 to some extent, i.e. when the first magnet unit 323 and the second magnet units 421 are misaligned, the first magnet unit 323 can be provided with restoration force such that, as illustrated in FIGS. 6B-6C, the first magnet unit 323 returns to the center of the arrangement structure of the second magnet units 421.

According to an embodiment, the restoration force applied to the first magnet unit 323 in FIG. 6B and FIG. 6C may be equally applied to the second magnet unit 421. Even when the ball structure 300 and the outer ring structure 400 move together or move separately, the first magnet unit 323 and the second magnet units 421 can consequently return to the original positions as illustrated in FIG. 6A.

Referring to FIG. 6D, the electronic device (for example, the electronic device 200) according to another embodiment may have a second magnet unit 421 formed integrally in a ring shape.

The shapes and arrangements of the first magnet unit 323 and the second magnet unit 421 disclosed herein are used as examples only. According to other embodiments, the first magnet unit 323 and the second magnet unit 421 may have various structures and shapes so that the outer ring structure 400 and the inner ring structure 320 are dynamically balanced, such that, for example, when the outer ring structure 400 and the inner ring structure 320 are moving, the relative position between the two elements is within an allowable range.

According to an embodiment, the electronic device (for example, the electronic device 200 of FIG. 2A) may be configured such that, when the outer ring structure 400 and the inner ring structure 320 move respectively, the first magnet unit 323 and the second magnet unit 421 receive forces that restore the dynamic balance.

For example, if the first magnet unit 323 and the second magnet unit 421 become increasingly misaligned during operation of the electronic device (for example, when the electronic device is moving), the outer ring structure 400 and the inner ring structure 320 may return to their original positions by the magnetic force generated between them. However, if the first magnet unit 323 is excessively misaligned from the second magnet unit 421, i.e. when the first magnetic unit 323 moves away from the second magnet unit 421 by greater than an allowed range, the dynamic balance may be broken. The present disclosure encompasses various shapes, numbers, and relative positioning of the first magnet unit 323 and the second magnet unit 421, as long as dynamic balance is maintained.

Figure 7:
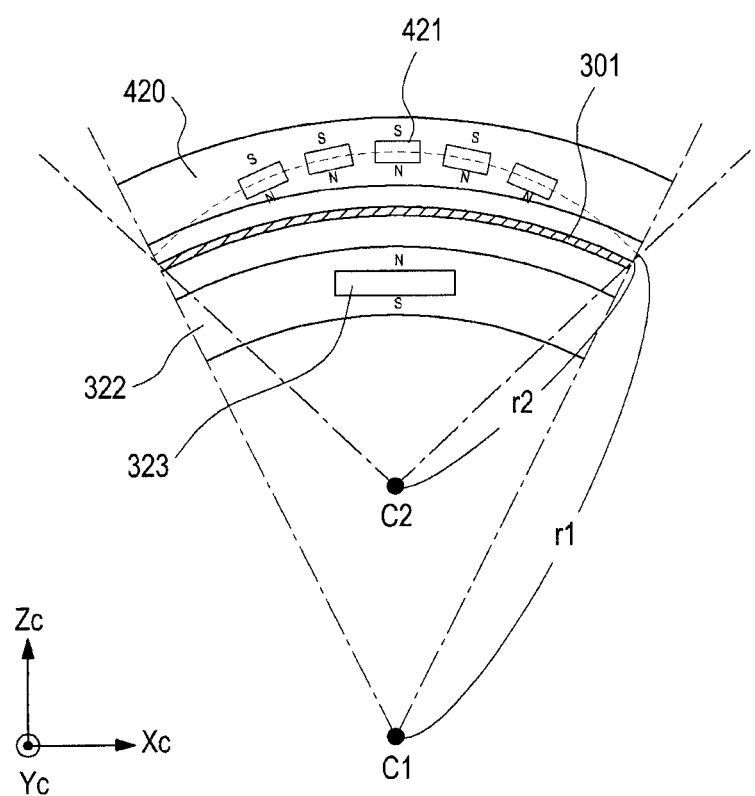
FIG. 7 illustrates an arrangement structure of the first magnet unit and the second magnet unit according to another embodiment of the present disclosure.

FIG. 7 illustrates an arrangement structure of the first magnet unit 323 and the second magnet unit 421 according to another embodiment of the present disclosure.

Although FIG. 5 illustrates a radial alignment where the second magnet unit 421 is in parallel with the circumferential direction of the outer ring structure 400, FIG. 7 illustrates an embodiment in which the second magnet unit 421 is not arranged in parallel with the circumferential direction of the outer ring structure 400.

According to an embodiment, the first magnet unit 323 and the second magnet unit 421 may be formed such that, when seen from above the electronic device (for example, the electronic device 200), the radius of curvature formed by a plurality of second magnet units 421 or a ring-shaped second magnet unit (for example, the second magnet unit 421 of FIG. 6D) is smaller than the radius of curvature of the housing 301. According to this embodiment, assuming that the center of the radius of curvature of the housing 301 ($r_1$) is $c_1$, the center of the radius of curvature of the second magnet units 421 (r2) may be c2, which is positioned between the center c1 and the housing 301.

According to this embodiment, second magnet units 421 or a ring-shaped second magnet unit (for example, the second magnet unit 421 of FIG. 6D) may be more bent toward the first magnet unit 323 as compared to the embodiment illustrated in FIG. 5. In this case, the magnetic force generated between the first magnet unit 323 and the second magnet unit 421 may be larger than that of the embodiment illustrated in FIG. 5, and the response rate when the outer ring structure 400 interworks with the inner ring structure 320 may be improved.

According to an embodiment, a repulsive force may act between the second magnet unit 421 arranged on the outer ring structure 400 and the first magnet unit 323. As explained above, magnets are arranged such that an attractive force acts between the second magnet unit 421 and the first magnet unit 323. If the dynamic balance between the second magnet unit 421 and the first magnet unit 323 is then broken, a part of the outer ring structure 400 may come to contact the housing 301, which may render the electronic device (for example, the electronic device 200) inoperable. Accordingly, according to an embodiment, a repulsive force may be provided between the second magnet 421 and the first magnet unit 323 to keep the outer ring structure 400 off the housing 301, such that, even if the dynamic balance is broken by an abruptly applied large external force, the electronic device (for example, the electronic device 200) can operate while the outer ring structure 400 and the housing 301 remain spaced apart by the repulsive force.

Figure 8A:
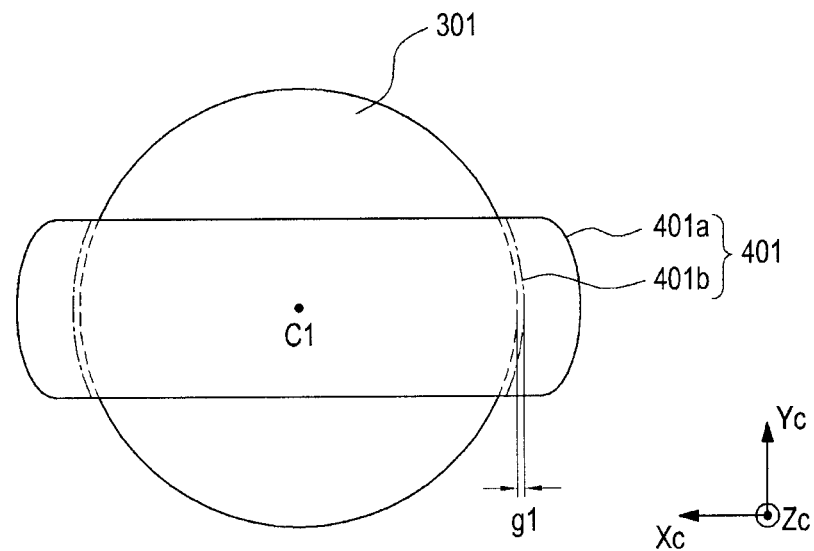
FIG. 8A is a conceptual diagram illustrating a coupling condition of the outer ring structure and the housing of the ball structure according to an embodiment of the present disclosure.
Figure 8B:
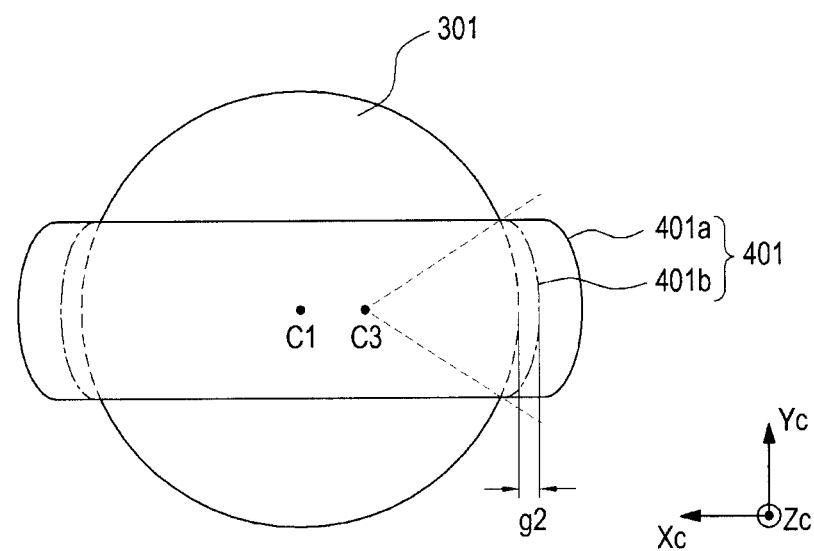
FIG. 8B is a conceptual diagram illustrating a coupling condition of the outer ring structure and the housing according to another embodiment of the present disclosure.

FIG. 8A is a conceptual diagram illustrating a coupling condition of an outer ring structure 400 and a housing 301 according to an embodiment of the present disclosure. FIG. 8B is a conceptual diagram illustrating a coupling condition of an outer ring structure 400 and a housing 301 according to another embodiment.

Referring to FIG. 8A, the outer ring structure 400 is spaced apart from the outer surface of the housing 301, according to an embodiment, such that a gap g1 may be formed between the outer ring structure 400 and the housing 301. The housing 401 of the outer ring structure 400 may include an outer surface 401a and an inner surface 401b, and the inner surface 401b may having a curved shape corresponding to the surface of the housing 301. The gap g1 between the inner surface 401b of the outer ring structure 400 and the housing 301 may be the maximum distance by which the outer ring structure 400 and the housing 301 are spaced apart from each other. According to another embodiment, the edge part of the inner surface 401b of the outer ring structure 400, which is an end of the line marked by alternate long and short dash line, can be approached to the housing 301. According to still another embodiment, the outer ring structure 400 and the housing 301 may occasionally contact each other when moving.

Referring to FIG. 8B, the outer ring structure 400 according to another embodiment is spaced apart from the outer surface of the housing 301, and a gap g2 may be formed between the outer ring structure 400 and the housing 301. According to this embodiment, the radius of curvature of the inner surface of the outer ring structure 400 may be smaller than the radius of curvature of the housing 301. According to this embodiment, assuming that the center of the radius of curvature of the housing 301 is c1, the center of the radius of curvature of the outer ring structure 400 may be c3 positioned between the center c1 and the housing 301.

The embodiments described with reference to FIG. 8A and FIG. 8B may be embodiments for preventing the outer ring structure 400 from moving away from the housing 301. According to these embodiments, even if the dynamic balance between the outer ring structure 400 and the inner ring structure 320 is suddenly broken, the range of escape for the outer ring structure 400 is physically limited so that the electronic device (for example, the electronic device 200) can quickly return from the abnormal operating condition to the normal operating condition.

According to an embodiment, an inclined surface (for example, the inclined surface 402 of FIG. 4) may be formed on an edge of the inner surface 401b of the outer ring structure 400. According to an embodiment, the inclined surface (for example, the inclined surface 402 of FIG. 4) may be used to prevent the outer ring structure 400 from detaching from the housing 301. According to another embodiment, the hardness of the material constituting the inclined surface (for example, the inclined surface 402 of FIG. 4) may be high so as to reduce damage resulting from contact between the outer ring structure 400 and the housing 301.

According to an embodiment, the electronic device (for example, the electronic device 200 of FIG. 2A) may include a processor (for example, the processor 120 of FIG. 1) configured such that, when first input information is received, the processor controls the first driving module (for example, the first driving module 310 of FIG. 3) to move the ball structure (for example, the ball structure 300 of FIG. 2A) toward a first direction in response to the received first input information. Further, when second input information is received, the processor controls the second driving module (for example, the second driving module 330 of FIG. 3) to move the inner ring structure (for example, the inner ring structure 320 of FIG. 3) in response to the received second input information.

The processor may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. § 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

According to an embodiment, the first input information and the second input information may be command and/or data input to the electronic device at the same time or at different times. According to an embodiment, the first input information and the second input information may be the same command or data or different commands or data.

When first input information and second input information are input, the processor (for example, the processor 120 of FIG. 1) may execute software (for example, the program 140 of FIG. 1) to control at least one movable element (for example, the first driving module 310 of FIG. 3 or the second driving module 330 of FIG. 3) of the electronic device (for example, the electronic device 200 of FIG. 2A)), or to control at least one other constituent element of the device (for example, the camera module 480 of FIG. 4, the sensor module 476 of FIG. 4, the display portion 460 of FIG. 4, or the audio module 470 of FIG. 4).

According to an embodiment, the operations of controlling the first driving module (for example, the first driving module 310 of FIG. 3) and the second driving module (for example, the second driving module 330 of FIG. 3) by the processor (for example, the processor 120 of FIG. 1) may occur independently. Accordingly, the outer ring structure (for example, the outer ring structure 400 of FIG. 3) may move when the ball structure (for example, the ball structure 300 of FIG. 3) moves, or the outer ring structure (for example, the outer ring structure 400 of FIG. 4) may move when the ball structure (for example, the ball structure 300 of FIG. 3) is stationary, thereby enabling dynamic movements of the electronic device (for example, the electronic device 200 of FIG. 2A).

According to an embodiment, the processor (for example, the processor 120 of FIG. 1) may be remotely controlled by an external electronic device (for example, the electronic device 102 of FIG. 1, the electronic device 104 of FIG. 1, or the server 108 of FIG. 1) by using the communication module (for example, the communication module 190 of FIG. 1) included in the electronic device (for example, the electronic device 200 of FIG. 2A). Therefore, the mobile electronic device (for example, the electronic device 200 of FIG. 2) may be directly operated by an external object or device.

According to an embodiment, the processor (for example, the processor 120 of FIG. 1) may perform control of the first driving module (for example, the first driving module 310 of FIG. 3) and control of the second driving module (for example, the second driving module 330 of FIG. 3) by using a rule-based model or an artificial intelligence model.

The rule-based model, according to an embodiment, may a) determine the validation of an event, b) refer to a knowledge base (not illustrated) provided in the electronic device (for example, the electronic device 200 of FIG. 2A), when the event occurs, and obtains a response, c) generate an action corresponding to the event, d) determine the priority of the action, or e) perform the action according to the highest priority. For example, when an event regarding input information reception occurs, and when the event includes, in the input information, two kinds of information regarding a sound output and a position movement, the processor (for example, the processor 120 of FIG. 1) may determine which action, between the sound output and the position movement, is to be prioritized according to the rule-based model and may perform the action according to the determination (for example, the position movement of the electronic device 200 of FIG. 2A may be followed by the designated sound output). The movement path of the electronic device (for example, the electronic device 200 of FIG. 2A) may be set through the rule-based model by using the position of an external object or the distance between the electronic device (for example, the electronic device 200 of FIG. 2A) and the external object as an input value.

According to an embodiment, the artificial intelligence model may have undergone learning using machine learning, neural networks, and/or deep learning. For example, the movement path of the electronic device (for example, the electronic device 200 of FIG. 2A) may be set through the artificial intelligence model by using the position of the external object or the distance between the electronic device (for example, the electronic device 200 of FIG. 2A) and the external object as an input value. According to an embodiment, the artificial intelligence model may be used to check the position of an obstacle and to set the optimal movement path to avoid or bypass the obstacle.

Figure 9:
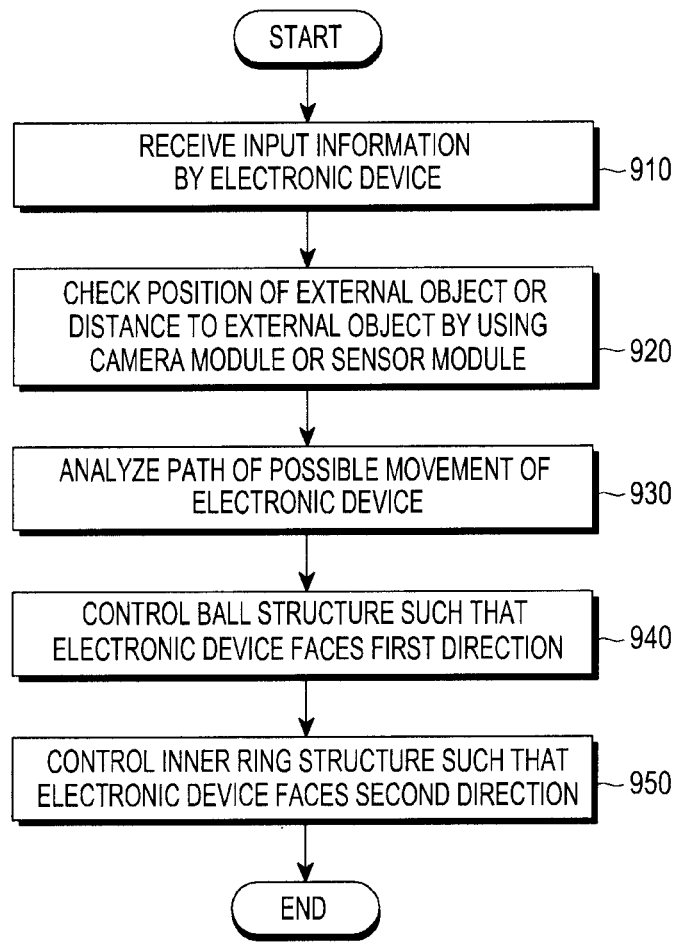
FIG. 9 is a flowchart of a method for operating an electronic device according to an embodiment of the present disclosure.

FIG. 9 is a flowchart of a method for operating an electronic device (for example, the electronic device 200 of FIG. 2A) according to an embodiment of the present disclosure. FIG. is a conceptual diagram illustrating an operating condition of the electronic device (for example, the electronic device 200 of FIG. 2A) according to an embodiment of the present disclosure.

An embodiment of the present disclosure provides a method for operating an electronic device including a ball structure (for example, the ball structure 300 of FIG. 2A); an outer ring structure (for example, the outer ring structure 400 of FIG. 2A) rotatably coupled to the outer surface of the ball structure (for example, the ball structure 300 of FIG. 2A); an inner ring structure (for example, the inner ring structure 320 of FIG. 3) arranged inside the ball structure (for example, the ball structure 300 of FIG. 2A) so as to face the outer ring structure (for example, the outer ring structure 400 of FIG. 2A); at least one camera module (for example, the camera module 480 of FIG. 2A) for acquiring an image of an external object; at least one sensor module (for example, the sensor module 476 of FIG. 2A) included in the outer ring structure (for example, the outer ring structure 400); and a processor (for example, the processor 120 of FIG. 1 or the auxiliary processor 123 of FIG. 1). The method may include the operations of: receiving input information by the electronic device (for example, the electronic device of FIG. 2A) (operation 910); and determining the position or distance between the electronic device (for example, the electronic device 200 of FIG. 2A) and an external object (0) by using an image obtained by the camera module (for example, the camera module 480 of FIG. 2A) or information obtained by the sensor module (for example, the sensor module 476 of FIG. 2A) (operation 920).

In relation to operation 910, the information input to the electronic device (for example, the electronic device 200 of FIG. 2A) may be received, as illustrated in the block diagram of the network environment (for example, the network environment 100) of FIG. 1, through the first network (for example, the first network 198 of FIG. 1) or through the second network (for example, the second network 199 of FIG. 1). For example, the input information may be information for initiating interaction with an external object O or a third object, and may include sound information of the external object O or the third object, information input from the external object O or the third object through a button or a touch pad, information regarding a sensed specific movement of the external object O or the third object, and information received through an external network.

In relation to operation 920, images obtained by the camera module (for example, the camera module 480 of FIG. 2A) or information recognized by using the sensor module (for example, the sensor module 476 of FIG. 2A) may serve as a basis for determining the direction of movement of the ball structure (for example, the ball structure 300 of FIG. 2A) and/or the direction of movement of the outer ring structure (for example, the outer ring structure 400 of FIG. 2A).

According to an embodiment, the electronic device operating method may include an operation of analyzing, by the processor (for example, the processor 120 of FIG. 1), the optimal path along which the electronic device (for example, the electronic device 200 of FIG. 2A) is supposed to move (operation 930).

In relation to operation 930, analysis of the optimal path may be conducted with reference to information regarding an obstacle B near the external object O or the electronic device (for example, the electronic device 200 of FIG. 2A). The processor (for example, the processor 120 of FIG. 1) may calculate or process the information regarding the obstacle B near the external object O or the electronic device (for example, the electronic device 200 of FIG. 2A) and information regarding the current position of the electronic device, thereby calculating the shortest time to reach the external object O or the path to reach the external object O most efficiently (for example, with low power consumption). According to an embodiment, the processor (for example, the processor 120 of FIG. 1) may analyze the optimal path by using the above-mentioned rule-based model or the artificial intelligence model.

According to an embodiment, the method for operating the electronic device (for example, the electronic device 200 of FIG. 2A) may include the operations of: controlling the ball structure (for example, the ball structure 300 of FIG. 2A) by the processor (for example, the processor 120 of FIG. 1) such that the electronic device (for example, the electronic device 200 of FIG. 2A) faces in a first direction (operation 940); and controlling the inner ring structure (for example, the inner ring structure 320 of FIG. 3) such that the electronic device (for example, the outer ring structure 400 of FIG. 2A) faces in a second direction (operation 950).

In relation to operation 940, control of the ball structure (for example, the ball structure 300 of FIG. 2A) may be performed through control of the first driving module (for example, the first driving module 310 of FIG. 3). In relation to operation 950, control of the inner ring structure (for example, the inner ring structure 320 of FIG. 3) may be performed through control of the second driving module (for example, the second driving module 330 of FIG. 3). According to an embodiment, the outer ring structure (for example, the outer ring structure 400 of FIG. 2A) is synchronized with the inner ring structure (for example, the inner ring structure 320 of FIG. 3) such that the outer ring structure (for example, the outer ring structure 400 of FIG. 2A) can be controlled by controlling the inner ring structure (for example, the inner ring structure 320 of FIG. 3).

Operation 940 and operation 950 may be performed independently, and may not be necessarily performed in the shown order. Thus, according to a different embodiment, the operation 950 may be performed first, and the operation 940 may then be performed.

Figure 10:
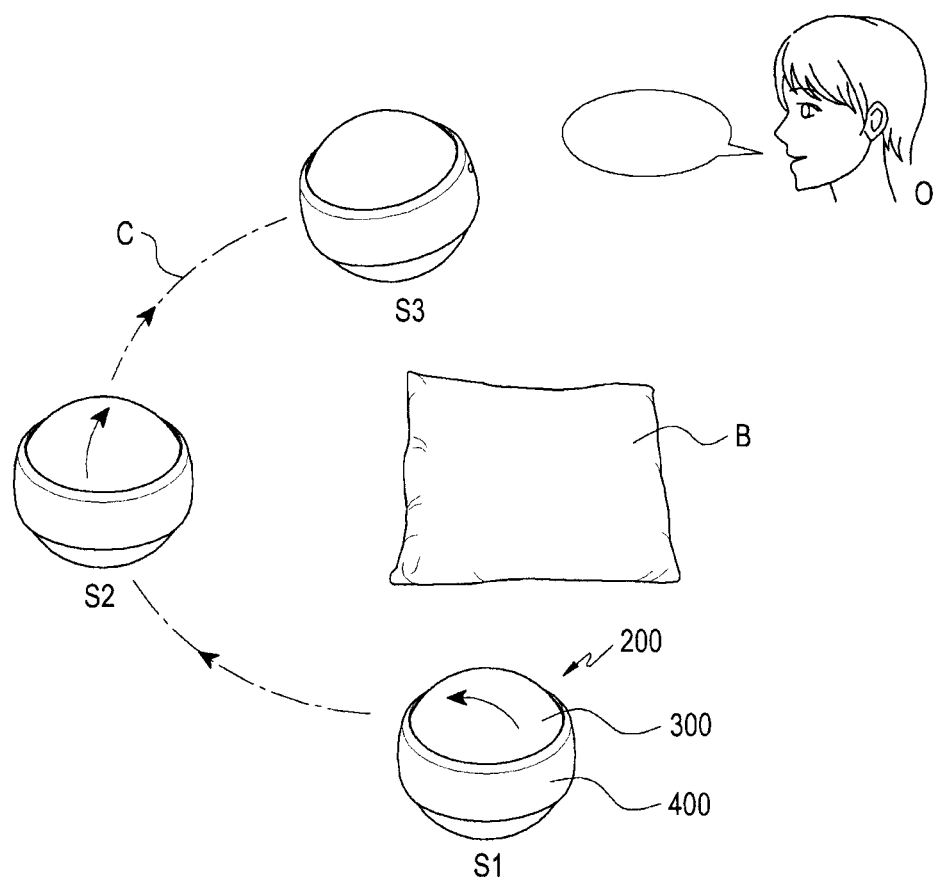
FIG. 10 is a conceptual diagram illustrating an operating condition of the electronic device according to an embodiment of the present disclosure.

Referring to FIG. 10, which is a conceptual diagram illustrating the operating condition of a mobile electronic device 200 (for example, the electronic device 101 of FIG. 1), the outer ring structure 400 may remain idle while the ball structure 300 rolls in the first direction. In other words, the outer ring structure 400 may maintain a constant condition without a tilting or rotation operation while the ball structure 300 rolls (for example, from point S1 to S2). When the ball structure 300 stops rolling, and upon reaching a distance at which communication with the external object O is possible (for example, point S3), the outer ring structure 400 may be operated to tilt or rotate toward the external object O.

The electronic device according to certain embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

According to an embodiment, an electronic device may include: a ball structure (for example, the ball structure 300 of FIG. 3) including a housing (for example, the housing 301 of FIG. 2A) and a first driving module (for example, the first driving module 310 of FIG. 3) configured to contact at least a part of an inner surface of the housing and to drive the housing; an outer ring structure (for example, the outer ring structure 400 of FIG. 4) rotatably coupled to an outer surface of the ball structure; an inner ring structure (for example, the inner ring structure 320 of FIG. 3) arranged inside the housing and configured to face the outer ring structure with the housing interposed therebetween; and a second driving module (for example, the second driving module 330 of FIG. 3) arranged inside the housing and configured to drive the inner ring structure.

According to an embodiment, the outer ring structure may be magnetically levitated from the outer surface of the housing by a magnetic force generated between the outer ring structure and the inner ring structure.

According to an embodiment, the first driving module may include: a first motor part (for example, the first motor part 311 of FIG. 3); a first inclined wheel (for example, the first inclined wheel 314a of FIG. 3) coupled to the first motor part and driven while contacting the part of the inner surface of the housing; a second inclined wheel (for example, the second inclined wheel 314b of FIG. 3) facing in a direction opposite to the first inclined wheel and driven while contacting the part of the inner surface of the housing; and a weight member (for example, the weight member 315 of FIG. 3).

According to an embodiment, the second driving module may include: a second motor member; a horizontal shaft member (for example, the horizontal shaft member 331 of FIG. 3) having a first end coupled to a part of an inner surface of the inner ring structure and having a second end coupled to a different part of the inner surface of the inner ring structure; a tilting member (for example, the tilting member 332 of FIG. 3) coupled to at least a part of the horizontal shaft member and configured to rotate the horizontal shaft member, thereby adjusting an inclination of the inner ring structure; and a rotating member (for example, the rotating member 334 of FIG. 3) coupled to at least a part of the tilting member and configured to rotate the tilting member, thereby rotating the inner ring structure in a circumferential direction.

According to an embodiment, at least a part of the inner ring structure may include a first magnet unit (for example, the first magnet unit 323 of FIG. 6A), at least a part of the outer ring structure may include a second magnet unit (for example, the second magnet unit 421 of FIG. 6A), and wherein the first magnet unit and the second magnet unit may face each other.

According to an embodiment, a repulsive force may act between the first magnet unit arranged on the inner ring structure and the second magnet unit arranged on the outer ring structure.

According to an embodiment, the second magnet unit may include a plurality of second magnet units or a ring-shaped second magnet unit, and in a front view of the electronic device, the plurality of second magnet units or the ring-shaped second magnet unit may be arranged to surround the first magnet unit.

According to an embodiment, in a top view of the electronic device, the plurality of second magnet units or the ring-shaped second magnet unit may have a radius of curvature that is smaller than a radius of curvature of the housing.

According to an embodiment, an inner surface of the outer ring structure may have a radius of curvature that is smaller than a radius of curvature of the housing.

According to an embodiment, at least a part of an inner surface of the outer ring structure may have an inclined surface.

According to an embodiment, the outer ring structure may include least one of a camera module (for example, the camera module 480 of FIG. 4) and a sensor module (for example, the sensor module 476 of FIG. 4) for recognizing an external object.

According to an embodiment, the electronic device may include a processor (for example, the processor 120 of FIG. 1) configured to, when first input information is received, control the first driving module to move the ball structure toward a first direction in response to the received first input information, and when second input information is received, control the second driving module to move the inner ring structure in response to the received second input information.

According to an embodiment, the first driving module and the second driving module may be controlled independently.

According to an embodiment, the processor may be remotely controlled by an external electronic device via a communication module provided inside the electronic device.

According to an embodiment, the processor may be configured to control the first driving module and the second driving module by using a rule-based model or an artificial intelligence model.

According to an embodiment, it is possible to provide an electronic device including: a ball structure (for example, the ball structure 300 of FIG. 3) including a housing (for example, the housing 301 of FIG. 2a) and a driving module (for example, the driving module 310 of FIG. 3) arranged inside the housing; an outer ring structure (for example, the outer ring structure 400 of FIG. 4) coupled to surround the ball structure and configured to rotate while being spaced apart from an outer surface of the ball structure; and an inner ring structure (for example, the inner ring structure 320 of FIG. 3) arranged inside the housing and configured to face the outer ring structure with the housing interposed therebetween, wherein the ball structure is configured to be able to roll toward a first direction and yaw with reference to an axis perpendicular to the first direction, and the outer ring structure is configured to tilt with respect to the first direction and rotate in a circumferential direction.

According to an embodiment, the outer ring structure may be magnetically levitated from the outer surface of the ball structure by a magnetic force generated between the outer ring structure and the inner ring structure.

According to an embodiment, it is possible to provide a method for operating an electronic device including a ball structure (for example, the ball structure 300 of FIG. 3), an outer ring structure (for example, the outer ring structure 400 of FIG. 4) rotatably coupled to an outer surface of the ball structure, an inner ring structure (for example, the inner ring structure 320 of FIG. 3) arranged inside the ball structure and configured to face the outer ring structure, at least one camera module (for example, the camera module 480 of FIG. 4) configured to acquire an image of an external object, at least one sensor module (for example, the sensor module 476 of FIG. 4) disposed on the outer ring structure, and a processor (for example, the processor 120 of FIG. 1), the method including the operations of: receiving input information by the electronic device; determining a distance between the electronic device and the external object by using the image obtained by the camera module and/or information obtained by the sensor module; analyzing an optimal path of movement of the electronic device; controlling the ball structure such that the electronic device faces a first direction corresponding to the path of movement; and controlling the outer ring structure to face a second direction.

According to an embodiment, the operation of controlling the ball structure and the operation of controlling the outer ring structure are performed independently.

According to an embodiment, when the ball structure is operated by the operation of controlling the ball structure, the outer ring structure remains idle.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

The embodiments disclosed in the present documents are for the purpose of describing and understanding of technical features without limiting the scope of the technologies disclosed in the present document. Therefore, the scope of the present document is to be interpreted as including all modifications based on the technical idea of the present document or various other embodiments.

What is claimed is:

1. An electronic device comprising:
    a ball structure including a housing and a first driving module configured to contact at least a part of an inner surface of the housing and to drive the housing;
    an outer ring structure rotatably coupled to an outer surface of the ball structure;
    an inner ring structure arranged inside the housing and configured to face the outer ring structure with the housing interposed therebetween; and
    a second driving module arranged inside the housing and configured to drive the inner ring structure.

2. The electronic device of claim 1, wherein the outer ring structure is magnetically levitated from the outer surface of the housing by a magnetic force generated between the outer ring structure and the inner ring structure.

3. The electronic device of claim 1, wherein the first driving module comprises:
    a first motor part;
    a first inclined wheel coupled to the first motor part and driven while contacting the part of the inner surface of the housing;
    a second inclined wheel facing in a direction opposite to the first inclined wheel and driven while contacting the part of the inner surface of the housing; and
    a weight member.

4. The electronic device of claim 1, wherein the second driving module comprises:
    a second motor member;
    a horizontal shaft member having a first end coupled to a part of an inner surface of the inner ring structure and having a second end coupled to a different part of the inner surface of the inner ring structure;
    a tilting member coupled to at least a part of the horizontal shaft member and configured to rotate the horizontal shaft member, thereby adjusting an inclination of the inner ring structure; and
    a rotating member coupled to at least a part of the tilting member and configured to rotate the tilting member, thereby rotating the inner ring structure in a circumferential direction.

5. The electronic device of claim 1, wherein at least a part of the inner ring structure comprises a first magnet unit, at least a part of the outer ring structure comprises a second magnet unit, and wherein the first magnet unit and the second magnet unit face each other.

6. The electronic device of claim 5, wherein a repulsive force acts between the first magnet unit arranged on the inner ring structure and the second magnet unit arranged on the outer ring structure.

7. The electronic device of claim 5, wherein the second magnet unit comprises a plurality of second magnet units or a ring-shaped second magnet unit, and in a front view of the electronic device, the plurality of second magnet units or the ring-shaped second magnet unit is arranged to surround the first magnet unit.

8. The electronic device of claim 7, wherein in top view of the electronic device, the plurality of second magnet units or the ring-shaped second magnet unit has a radius of curvature that is smaller than a radius of curvature of the housing.

9. The electronic device of claim 1, wherein an inner surface of the outer ring structure has a radius of curvature that is smaller than a radius of curvature of the housing.

10. The electronic device of claim 1, wherein at least a part of an inner surface of the outer ring structure has an inclined surface.

11. The electronic device of claim 1, wherein the outer ring structure comprises at least one of a camera module and a sensor module for recognizing an external object.

12. The electronic device of claim 1, wherein the electronic device comprises a processor configured to:
when first input information is received, control the first driving module to move the ball structure toward a first direction in response to the received first input information; and
when second input information is received, control the second driving module to move the inner ring structure in response to the received second input information.

13. The electronic device of claim 12, wherein the first driving module and the second driving module are controlled independently.

14. The electronic device of claim 12, wherein the processor is remotely controlled by an external electronic device via a communication module provided inside the electronic device.

15. The electronic device of claim 12, wherein the processor is further configured to control the first driving module and the second driving module by using a rule-based model or an artificial intelligence model.

16. An electronic device comprising:
a ball structure including a housing and a driving module arranged inside the housing;
an outer ring structure coupled to surround the ball structure and configured to rotate while being spaced apart from an outer surface of the ball structure; and
an inner ring structure arranged inside the housing and configured to face the outer ring structure with the housing interposed therebetween, wherein:
the ball structure is configured to be able to roll toward a first direction and yaw with reference to an axis perpendicular to the first direction, and
the outer ring structure is configured to tilt with respect to the first direction and rotate in a circumferential direction.

17. The electronic device of claim 16, wherein the outer ring structure is magnetically levitated from the outer surface of the ball structure by a magnetic force generated between the outer ring structure and the inner ring structure.

18. A method for operating an electronic device comprising a ball structure, an outer ring structure rotatably coupled to an outer surface of the ball structure, an inner ring structure arranged inside the ball structure and configured to face the outer ring structure, at least one camera module configured to acquire an image of an external object, at least one sensor module disposed on the outer ring structure, and a processor, the method comprising:
receiving input information by the electronic device;
determining a distance between the electronic device and the external object by using the image obtained by the camera module and/or information obtained by the sensor module;
analyzing a path of movement of the electronic device;
controlling the ball structure such that the electronic device faces a first direction corresponding to the path of movement; and
controlling the outer ring structure to face a second direction.

19. The method of claim 18, wherein the controlling of the ball structure and the controlling of the outer ring structure are performed independently.

20. The method of claim 18, wherein, when the ball structure is operated by the controlling the ball structure, the outer ring structure remains idle.

* * * * *